(12) United States Patent
Hutton et al.

(10) Patent No.: US 7,018,137 B2
(45) Date of Patent: Mar. 28, 2006

(54) APPARATUS AND PROCESS FOR INSTALLING "T" COUPLINGS ON UNDERGROUND PIPE

(75) Inventors: William M. Hutton, Nazareth, PA (US); Frank P. Russo, Swiftwater, PA (US)

(73) Assignee: Omega Tools, Inc., Portland, PA (US)

(*) Notice: Subject to any disclaimer, the term of this patent is extended or adjusted under 35 U.S.C. 154(b) by 0 days.

(21) Appl. No.: 10/881,049

(22) Filed: Jun. 30, 2004

(65) Prior Publication Data

US 2006/0002766 A1 Jan. 5, 2006

(51) Int. Cl.
*F16L 55/18* (2006.01)

(52) U.S. Cl. .............. 405/184.1; 405/184.3; 285/21.1; 285/197

(58) Field of Classification Search .......... 405/154.1, 405/184.1–5; 138/89, 92, 155, 140–143, 138/112; 285/21.1, 23, 197–199; 137/15.08, 137/15.13; 29/33 T, 213.1, 890.1
See application file for complete search history.

(56) References Cited

U.S. PATENT DOCUMENTS

| 4,035,002 A * | 7/1977 | Curtin ............ 285/31 |
| 4,091,514 A | 5/1978 | Motes-Conners et al. |
| 4,247,216 A | 1/1981 | Pansini |
| 4,519,124 A * | 5/1985 | Burghardt ............ 138/97 |
| 4,608,848 A * | 9/1986 | Mele ............ 72/184 |
| 4,647,073 A * | 3/1987 | Kosaka ............ 285/23 |
| 4,663,796 A | 5/1987 | Helling et al. |
| 4,832,069 A * | 5/1989 | Gale et al. ............ 137/15.13 |
| 4,934,109 A | 6/1990 | Allred |
| 5,095,564 A * | 3/1992 | Kruger ............ 285/197 |
| 5,364,207 A | 11/1994 | Reber et al. |
| 5,430,921 A | 7/1995 | McGuire |
| 5,462,077 A | 10/1995 | Cohen et al. |
| 5,570,617 A | 11/1996 | Love |
| 5,613,807 A | 3/1997 | Reber et al. |
| 5,624,206 A | 4/1997 | Cohen et al. |
| 5,659,935 A * | 8/1997 | Lo-Pinto et al. ......... 29/33 T |
| 5,722,666 A * | 3/1998 | Sisk ............ 285/367 |
| 5,791,073 A | 8/1998 | Palmer et al. |
| 5,913,335 A | 6/1999 | Lyall |
| 5,988,689 A | 11/1999 | Lever |
| 6,142,165 A * | 11/2000 | Wartel et al. ............ 137/15.13 |
| 6,627,037 B1 | 7/2001 | McCoy Jr. et al |
| 6,618,966 B1 | 9/2003 | Russo et al. |
| 6,669,406 B1 * | 12/2003 | Hutton et al. ............ 405/184.1 |
| 6,684,908 B1 | 2/2004 | Hutton et al. |

FOREIGN PATENT DOCUMENTS

| EP | 300795 | * | 1/1989 |
| GB | 2038973 A | | 7/1980 |
| JP | 2002-13693 | | 1/2002 |

* cited by examiner

*Primary Examiner*—Jong-Suk (James) Lee
(74) *Attorney, Agent, or Firm*—Paul & Paul

(57) ABSTRACT

A tool assembly and a process for using it is provided, wherein a single elongate handle member may be used, through a small hole at the ground surface, to reach underground pipes for installing different sized strap "T" couplings on different sized pipes, and for driving sleeve members associated with said strap "T" couplings, pneumatically, from above ground, to engage pipes at various locations below ground.

14 Claims, 3 Drawing Sheets

APPARATUS AND PROCESS FOR INSTALLING "T" COUPLINGS ON UNDERGROUND PIPE

BACKGROUND OF THE INVENTION

1. Field of the Invention

This invention is directed to an apparatus and process for installing a "T" connection onto underground pipe, through a hole at ground level that is sufficiently small as to minimize disturbance to the surrounding landscape.

2. Description of the Prior Art

In accordance with prior art techniques for installing "T" joints or connections to underground pipe, traditionally such requires excavating a hole that is sufficiently large at the surface of the ground, to allow workers to enter the hole and install connections. However, such generally requires considerable removal of earth, in order to provide sufficient access to the underground pipe, that the ground, at its upper surface, is widely disturbed.

SUMMARY OF INVENTION

The present invention is directed to installing one or more connection "Ts", of various sizes, onto generally horizontal pipes located underground, through a small hole at the ground level, such that the installations can be done without requiring workers to enter the hole to effect the installation, but rather, such that the tool can be used to install the "Ts" from a remote location above ground.

Accordingly, it is an object of this invention to provide a tool assembly for working on underground pipes of different sizes, wherein the depth of the pipes below ground is substantially greater than the size of the hole at the ground surface.

It is another object of this invention to accomplish the above object, wherein the tool assembly includes an elongate handle and a swing arm at the lower end of the handle, which is pivotally driven from above ground, so as to engage any of a plurality of different sized strap "T" couplings that correspond to different sized pipes.

It is a further object of this invention to accomplish the above objects, wherein the tool assembly is pneumatically operated.

It is a further object of this invention to accomplish the above objects, wherein a single handle device may be used to accommodate different sized strap "T" couplings.

Further objects of this invention involve the process of working on underground pipes of different sizes through holes in the ground, while employing selected ones of different sized strap "T" couplings for different sized pipes.

Other objects and advantages of the present invention will be readily apparent upon the reading of the following brief descriptions of the drawing figures, detailed descriptions of the preferred embodiments, and the appended claims.

BRIEF DESCRIPTION OF THE DRAWING FIGURES

DETAILED DESCRIPTIONS OF THE PREFERRED EMBODIMENTS

Figure 1:
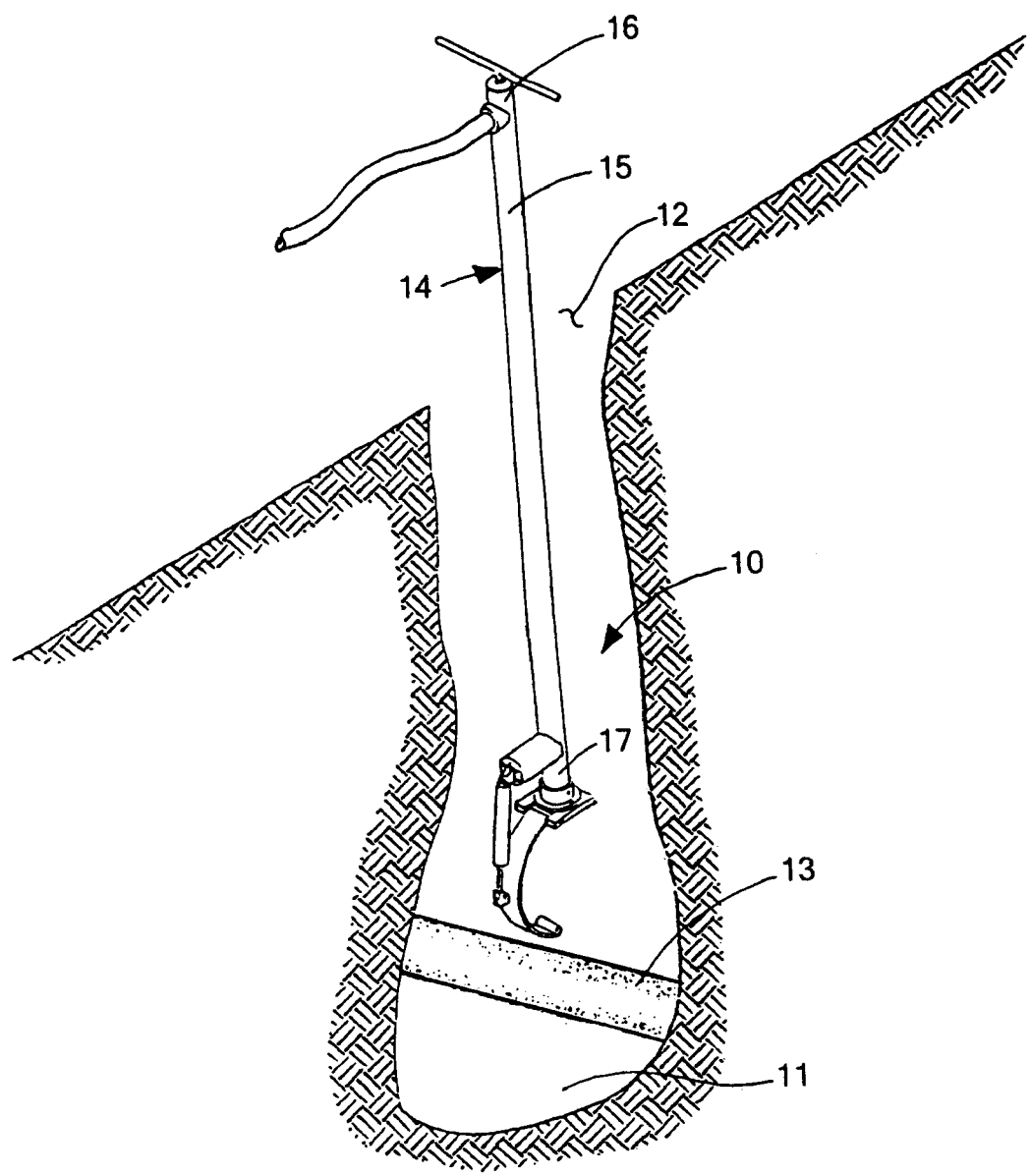
FIG. 1 is a perspective view of a tool in accordance with this invention, disposed in a hole in which an underground pipe is located, which tool is adapted to engage a strap "T" coupling (not shown) for application to the underground pipe.

Referring now to the drawings in detail, reference is first made to FIG. 1, wherein an underground hole is identified by the numeral 10, having a hole bottom at 11, and a ground surface access opening shown at 12.

Typically, the depth of the hole 10 may be on the order of 4 feet, whereas the diameter of the opening 12 at the ground surface may be on the order of 18 inches.

The hole 10 has been made to reveal an underground pipe 13, which pipe 13 may be of various types, such as an underground natural gas pipe main, a water pipe, or of any other desired type.

The tool assembly of this invention is generally designated by the numeral 14, to comprise an elongate handle member 15, having an upper end 16, and a lower end 17. A compressed air, or pneumatic source is provided via inlet line 18, connected to the upper end of the handle member 16 via connection 20, such that air entering the line 18 in the direction of the arrow 21, is delivered to the interior of the handle member 16, to pass through the vertical conduit 21, downwardly, to be delivered via outlet conduit 22, to a pneumatic cylinder 23 pivotally connected thereto at 24, as shown in FIG. 2.

The compressed air thus applied to the cylinder 23 will drive a drive rod 25, via a piston (not shown) located within the cylinder 23.

Figure 2:
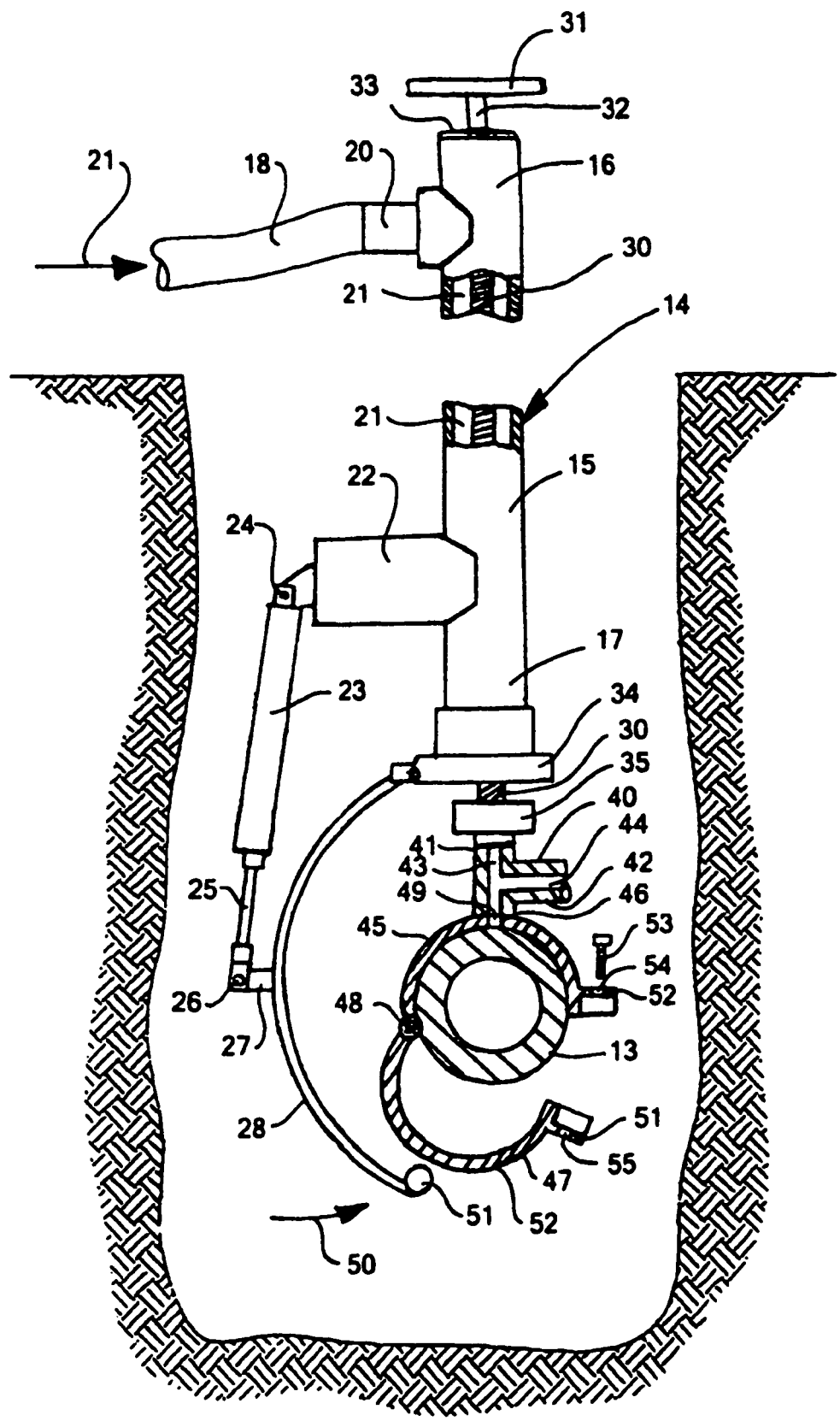
FIG. 2 is a vertical sectional view, through the ground hole of FIG. 1, and through the underground pipe and the strap "T" coupling, with the tool assembly itself being partially fragmentally illustrated to reveal its internal structure, and with the tool assembly being shown foreshortened in vertical height.

The drive rod 25 is pivotally connected at 26 to a pivot bracket 27, that carries an actuator swing arm 28, arcuately configured, as shown in FIGS. 1 and 2.

Running down through the center of the elongate handle 15, is a threaded drive rod 30, actuable from above, via a turn handle 31, connected thereto at 32, through an opening in a cap 33 of the handle member 15, with the threaded rod 30 extending out past the baseplate 34 at the lower end 17 of the handle member 15.

Suitable air seals (not shown) are provided between the handle connector 32 and the end cap 33, and between the lower end of the threaded rod 30 and the baseplate 34, to prevent unnecessary escape of compressed air.

The lower end of the threaded member 30, is threadingly engaged within a connector 35. The connector 35 will be any of various sizes as will accommodate the lower end of the threaded rod 30 at the upper end, and will have threadingly secured thereto at its lower end a "T" type strap coupling member 40, constructed generally as shown in FIG. 2, having a vertical extension portion 41 and a horizontal extension portion 42. The vertical extension portion will have an upwardly opening conduit 43, and the horizontal extension portion will have a generally horizontally opening conduit 44.

The strap "T" coupling member 40 carries the upper arcuate half 45 of a sleeve member adapted to be clamped to the pipe 13, generally being welded to said upper half sleeve member, at 46.

The lower arcuate half 47 of the sleeve member is pivotally connected to the upper half 45 at 48, as shown, and upon actuation by the pneumatic cylinder 23, the actuator swing arm 28 is adapted to move inwardly, in the direction of the arrow 50 shown, such that its contact element 51 carried thereby can engage the outer surface 52 of the sleeve lower half member 47, such that its lower bracket 51 may be moved toward engagement with the upper bracket 52 of the upper sleeve half 45, so that a threaded member 53 may pass through hole 54 in bracket 52, and threadingly engage itself with threaded hole 55 of bracket member 51, so that the sleeve is closed, with its two halves 45 and 47 securely clamped together.

With the sleeve securely clamped onto the pipe 13, the handle 31 may be actuated, such that the threaded rod 30 with the connector 35 is unscrewed, leaving access to the vertical conduit 43 in the "T" coupling member 40, for insertion of another tool (not shown) which can enter the vertical conduit 43, and cut a hole through the portion of the pipe 13 disposed therebeneath.

That portion of the upper sleeve member 45 disposed immediately below the vertical conduit 43, has an opening 49 in communication with vertical conduit 43 for cutting a hole into the pipe 13.

Thus, in operation of the tool assembly 14 as described above, after an opening is cut into the pipe 13, the vertical conduit 43 can be plugged, such that the conduit 44 in horizontal strap "T" member 40 may thus be used to tap into gas, water, or other fluid carried within the pipe 13, such as, for connecting a residence, building, or the like to the pipe main 13.

As has been mentioned above, different sized connectors 35 may engage the lower end of the threaded rod 30, as may be desired.

Figure 3:
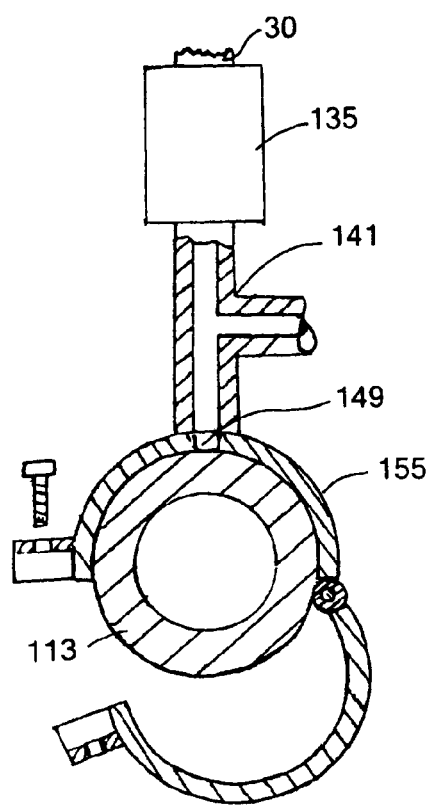
FIG. 3 is a vertical sectional view, taken through another size of underground pipe, with a complementary size of strap "T" being applied thereto, and being carried by a connector that, in turn, is carried by the lower end of the tool assembly.

With reference to FIG. 3, for example, the lower end of the drive rod 30 may engage a larger connector 135, that, in turn is connected to a corresponding larger strap "T" coupling 141, that carries a larger sleeve 155 with access opening 149, for, in turn, accommodating a larger sized underground pipe 113.

Figure 4:
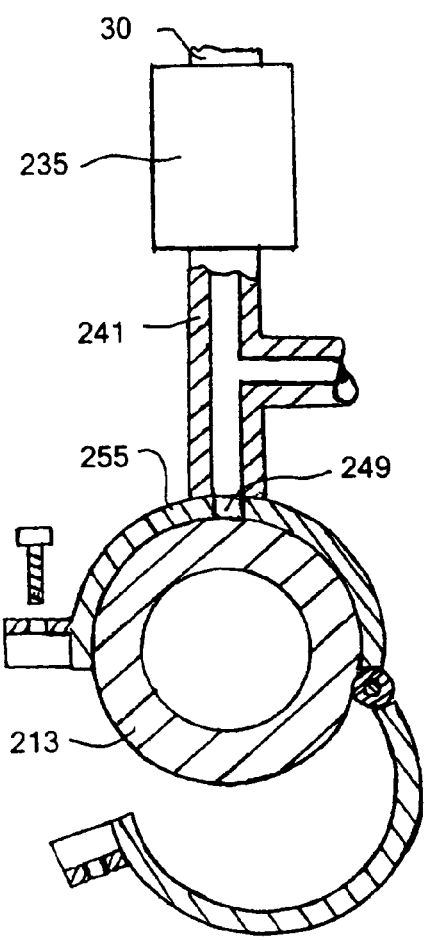
FIG. 4 is an illustration similar to that of FIG. 3, but wherein the underground pipe, strap "T" coupling, and connector are of an even greater size than the sizes indicated in FIGS. 2 and 3.

Similarly, with reference to FIG. 4, the threaded member 30 may accommodate an even larger connector 235, attached to its associated strap "T" coupling 241, that carries an even larger sleeve 255 with its access opening 249, which, in turn, is adapted to engage an even larger underground pipe 213.

The strap "T" members 40 are also referred to as "fittings", for the "sleeves". The handle 31 referred to herein is also frequently referred to as a crank, or crank member.

It will thus be understood that, in accordance with this invention, with a single handle 14, that is universally usable with a plurality of different sized connectors and strap "T" couplings, the handle 14 is provided with versatility, such that, workers going from one location to another, where they may have to accommodate different size pipes or mains, do not have to carry a variety of different elongate handles, but can use a single handle member for accommodating the installation of strap "T" including their associated fittings, on different size underground pipes.

It will be apparent from the foregoing that various modifications may be made, in the details of construction and in the use and operation of the tool assembly of this invention, all within the spirit and scope of the invention as defined in the appended claims.

What is claimed is:

1. A tool assembly for working on underground pipes of different sizes through a hole at the ground surface and optionally employing any one of a plurality of differently sized strap "T" couplings for different sized pipes, wherein the depth of the pipe below ground is substantially greater than the size of the hole at the ground surface, the tool assembly comprising:
    (a) an elongate handle member adapted to extend generally vertically at an upper end of the handle member from a position substantially above a ground level hole to a location substantially proximate a below ground pipe at a lower end of the handle member;
    (b) a swing arm pivotally mounted about a generally horizontal pivot at the lower end of the handle member;
    (c) drive means associated with said elongate handle member and adapted to be actuated from the upper end of the handle member and to drivingly pivot the swing arm toward and away from a generally horizontally disposed in-ground-pipe;
    (d) a plurality of different sized strap "T" couplings corresponding to different sized pipes;
    (e) a plurality of different sized connectors corresponding to associated different sized strap "T" couplings, each having means for connection to the lower end of the elongate handle member; whereby
    (f) said elongate handle member can optionally have connected and disconnected thereto any one of said plurality of different sized strap "T" couplings, for driving from above ground.

2. The tool assembly of claim 1, including pneumatic means carried by said elongate handle member, for driving said strap "T" couplings through said elongate handle member from above ground.

3. The tool assembly of claim 2, wherein said pneumatic means includes a piston cylinder.

4. The tool assembly of claim 1, wherein said connectors and the lower end of said elongate handle member are threaded for connection together.

5. The tool assembly of claim 4, wherein said elongate handle member is provided with a crank at its upper end for connecting and disconnecting said strap "T" couplings to the lower end of said elongate handle member from above ground.

6. The tool assembly of claim 1, wherein said swing arm is generally arcuately configured.

7. The tool assembly of claim 1, including pneumatic means carried by said elongate handle member, for driving said strap "T" couplings through said elongate handle member from above ground, wherein said connectors and the lower end of said elongate handle member are threaded for connection together, wherein said elongate handle member is provided with a crank at its upper end for connecting and disconnecting said strap "T" couplings to the lower end of said elongate handle member from above ground, wherein said pneumatic means includes a piston cylinder and wherein said swing arm is generally arcuately configured.

8. A process for working on underground pipes of different sizes through a hole at the ground surface and optionally employing any one of a plurality of differently sized strap "T" couplings for different sized pipes, wherein the depth of the pipe below ground is substantially greater than the size of the hole at the ground surface, the process comprising:

(a) providing an elongate handle member and placing it generally vertically, with the upper end of the handle member substantially above a ground level hole and with the lower end of the elongate handle member substantially proximate a below ground pipe;

(b) providing a swing arm pivotally mounted about a generally horizontal pivot at the lower end of the elongate handle member;

(c) actuating a drive means associated with said elongate handle member from the upper end of the elongate handle member to drivingly pivot the swing arm toward and away from a generally horizontally disposed in-ground-pipe;

(d) providing a plurality of different sized strap "T" couplings corresponding to different sized pipes;

(e) providing a plurality of different sized connectors corresponding to associated different sized strap "T" couplings, each having means for connection to the lower end of the elongate handle member; and (f) selectively connecting and disconnecting to the elongate handle member any one of said plurality of different sized strap "T" couplings, via an associated connector and driving the couplings from above ground.

9. The process of claim 8, including the step of pneumatically driving said elongate strap "T" couplings through said handle member from above ground.

10. The process of claim 9, wherein the step of pneumatically driving includes using a piston cylinder.

11. The process of claim 8, including the step of threading a selected one of the connectors and the lower end of said elongate handle member into connected together relation.

12. The process of claim 11, including the step of providing the elongate handle member with a crank at its upper end for connecting and disconnecting said strap "T" couplings to the lower end of said elongate handle member from above ground.

13. The process of claim 8, wherein the step of providing a swing arm includes providing a swing arm that is generally arcuately configured.

14. The process of claim 8, including the step of pneumatically driving said strap "T" couplings through said elongate handle member from above ground, including the step of threading a selected one of the connectors and the lower end of said elongate handle member into connected-together relation, including the step of providing the elongate handle member with a crank at its upper end for connecting and disconnecting said strap "T" couplings to the lower end of said elongate handle member from above ground, wherein the step of pneumatically driving includes using a piston cylinder and wherein the step of providing a swing arm includes providing a swing arm that is generally arcuately configured.

* * * * *